Nov. 8, 1927. 1,648,173

T. L. GREEN ET AL

LUBRICATING SYSTEM

Filed Feb. 17, 1923 2 Sheets-Sheet 1

Inventors:
Thomas L. Green.
William Presley Morton.
Charles H. Williams.

Nov. 8, 1927. 1,648,173
T. L. GREEN ET AL
LUBRICATING SYSTEM
Filed Feb. 17, 1923   2 Sheets-Sheet 2
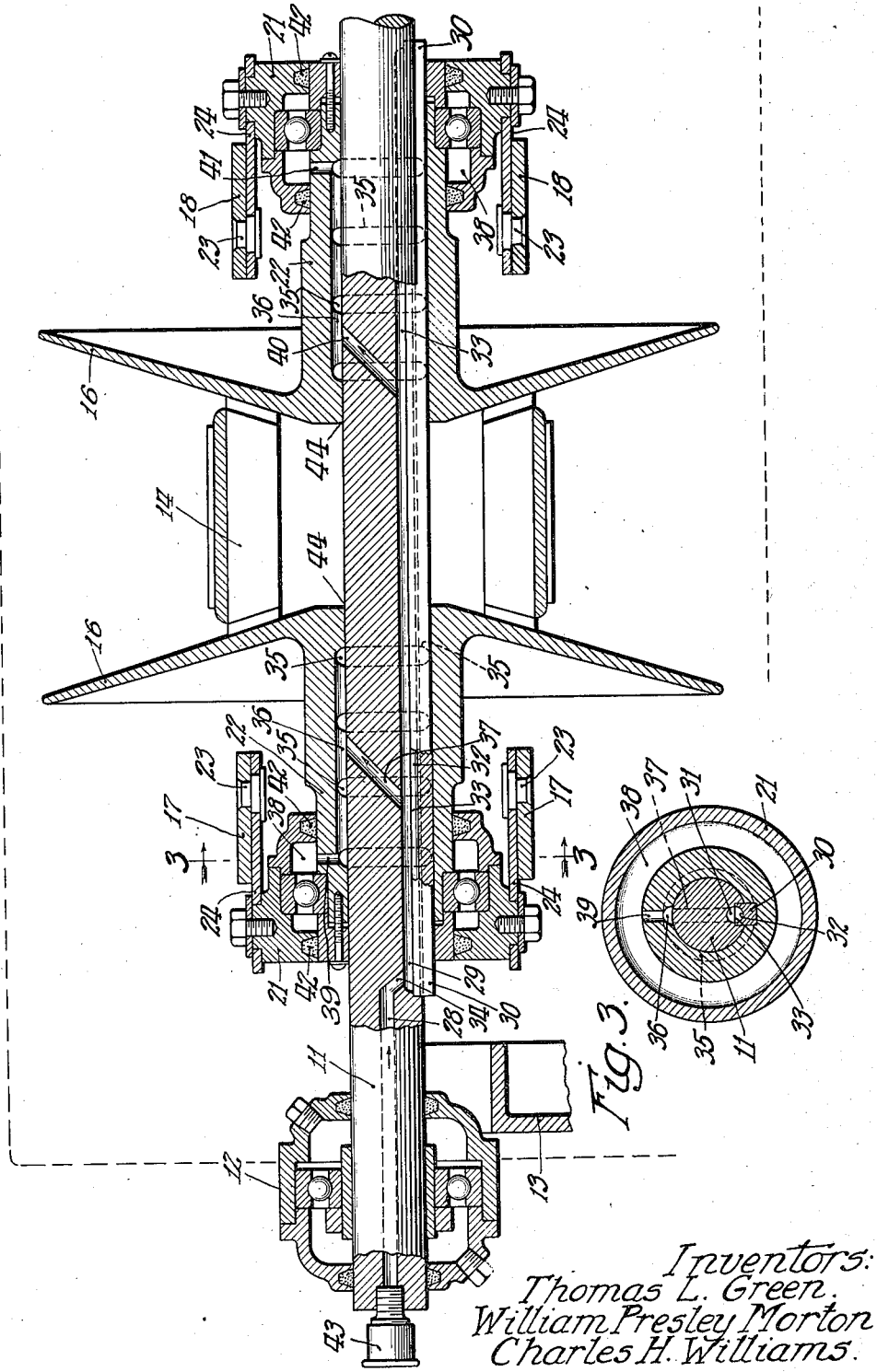
Inventors:
Thomas L. Green.
William Presley Morton.
Charles H. Williams.
Emery, Booth, Janney & Varney
Attys.

Patented Nov. 8, 1927.

1,648,173

UNITED STATES PATENT OFFICE.

THOMAS L. GREEN, WILLIAM PRESLEY MORTON, AND CHARLES H. WILLIAMS, OF INDIANAPOLIS, INDIANA; SAID WILLIAMS AND SAID MORTON ASSIGNORS TO SAID GREEN.

LUBRICATING SYSTEM.

Application filed February 17, 1923. Serial No. 619,579.

The invention relates to lubricating systems for variable speed transmissions and other mechanisms in which certain problems involving lubrication arise. Among other objects, the invention is intended to provide an improved system of lubrication for mechanisms of this character which is reliable and will minimize the attention and care necessary to maintain the operating efficiency of the mechanism.

The invention consists in the novel constructions, arrangements and combinations hereinafter described and claimed, for carrying out the above stated objects and other objects which will appear hereinafter.

The nature of the invention may be best explained by referring to one illustrative construction comprising a certain type of variable speed transmission having a lubricating system embodying the invention. Such construction is illustrated in the accompanying drawings.

In said drawings, Fig. 1 is a plan view of the mechanism.

Fig. 2 is a vertical cross section taken along the line 2—2 of Fig. 1.

Fig. 3 is a transverse section taken along the line 3—3 of Fig. 2.

Figure 1:
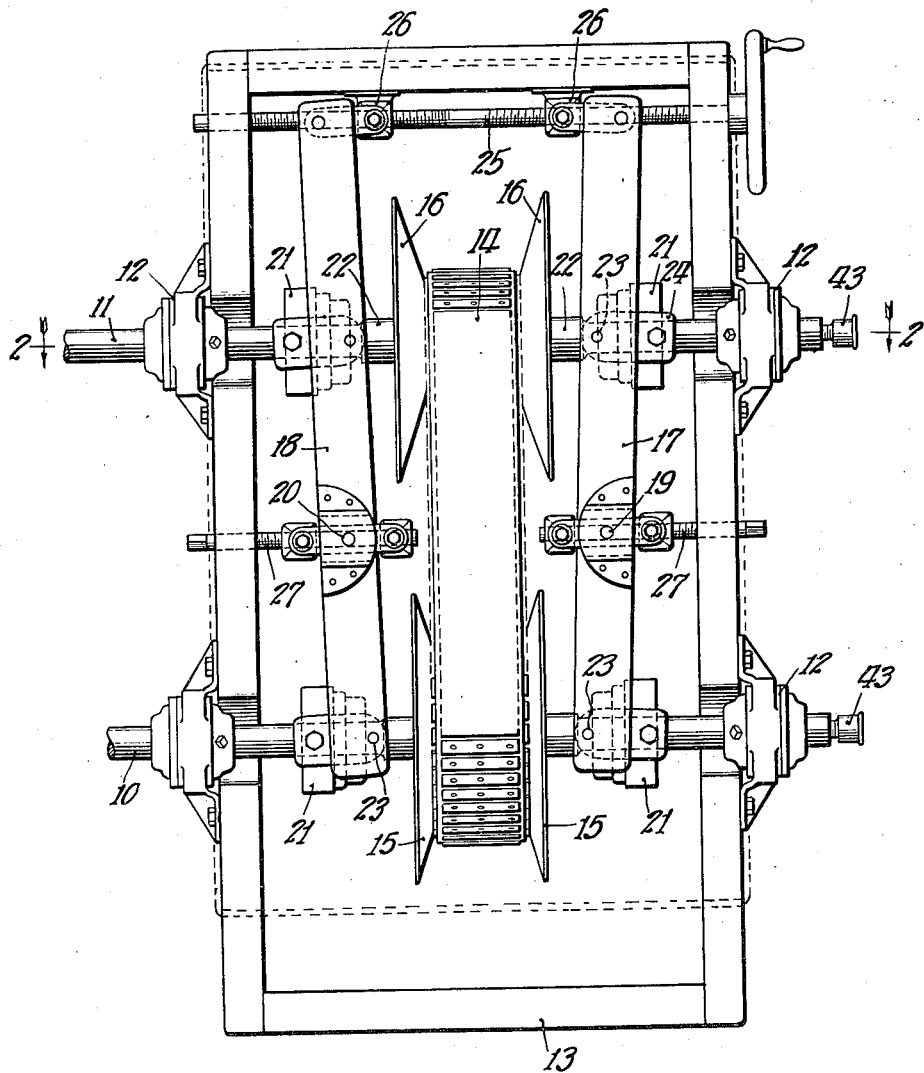

The illustrative construction comprises a typical variable speed transmission, the general characteristics of which form no part of the present invention but will be briefly described to afford a better understanding of the illustrative lubricating system employed in connection with this transmission. Power may be applied to the transmission through the shaft 10 and taken off through the shaft 11, both of which are supported in ball bearings 12 in the frame 13. Power is transmitted from one shaft to the other by a flexible friction belt 14 of suitable construction which travels between pairs of conical friction discs 15 and 16 slidably keyed or splined to the shafts 10 and 11 respectively. Speed variation is effected by simultaneously varying the distance between the respective pairs of discs, thereby varying proportionally the effective driving radii of the belt on the discs. The relative adjustment of the discs and shaft is effected by pairs of levers 17 and 18 pivoted at 19 and 20 intermediate the shafts 10 and 11.

The levers are connected with the discs through ball bearings 21 suitably mounted on the hubs 22 of the discs. The levers are suitably pivoted to the bearings 21, for example, by a pivotal connection, as at 23, with the members 24 extending from the housings of the bearings. The thrust between the levers and the discs is transmitted directly through the balls of the bearings. A double pitched screw 25 mounted near one end of the frame and carrying screw blocks 26 to which the ends of the levers are pivoted, serves to operate the latter to effect the desired speed variation. The pivots 19 of the levers are made adjustable through screws 27 to make the necessary adjustment for stretching or variation in length of belts.

The system of lubricating the discs and related parts is shown more in detail in Figs. 2 and 3. The arrangement there shown is duplicated also for the shaft 10. A suitable passage is provided for conducting lubricant along the shaft to the power transmitting elements or discs 16. Passages are provided for distributing the lubricant between the bearing surfaces throughout the region of adjustment of the discs on the shaft. In the illustrative arrangement, a central bore or passage 28 is made in one end of the shaft, preferably the end opposite that at which the power is delivered or applied. This passage extends adjacent the end of the keyway 29 within which the key or spline 30 is seated. The keyway and spline are constructed and arranged to provide a passage for conducting lubricant. For example, the bottom of the keyway is grooved as at 31 and the adjacent face of the key is likewise grooved as at 32 to provide the passage 33 running any desired distance along the keyway. This passage is connected with the passage 28 by the passage 34, preferably inclined in the direction in which the lubricant travels.

From the passage 33, lubricant is conveyed to lubricating passages in the bearing surface of the power-transmitting element,— that is, the face of the power transmitting element adjacent the shaft. Such passages are distributed along the bearing surface between the power transmitting element and the shaft preferably with a spacing, longitudinally along the shaft, somewhat less than the ordinary minimum adjustment between the power transmitting element and the shaft. In the arrangement shown, the bearing surface of the shaft 22 of the disc is provided with the plurality of lubricating grooves 35, preferably running from one side of the spline 30 around the bearing surface to the opposite side of the spline. The grooves 35 are connected by a longitudinal groove or passage 36 within the bearing face of the hub. This groove is connected with the passage 33 in the shaft by a passage 37, leading from the passage 33 and terminating at the surface of the shaft in register with groove 36. Preferably the passage 37 is inclined in the direction in which the lubricant travels.

Suitable means are also provided for lubricating the bearings 21. Lubrication is effected conveniently by connecting the interior 38 of the bearing with the lubricant distributing passage 36 by means of a passage 39.

The opposite disc 16 and bearing 21 are preferably supplied wth lubricant from the same end of the shaft and preferably through a continuation of the keyway passage 33. The bearing surface of the disc is provided with passages arranged similarly to those in the opposite disc and connected with the shaft supply passage 33 by the passage 40, preferably inclined. The interior of the bearing 21 is supplied wth lubricant through the passage 41. The bearings 21 are provided with suitable packings 42 to retain the lubricant and exclude foreign substances.

Lubricant is supplied at an exposed portion of the shaft, preferably the end, to the passage 28 in any suitable manner such as, for example, a device 43 to which a grease gun may be connected for forcing the lubricant through the passages and into the bearings. If desired, an ordinary grease cup may be attached to the end of the shaft.

The members on the shaft 10 are provided with a similar lubricating system which need not be described.

The improved system of lubrication is well suited for use in connection with mechanisms such as variable speed transmissions which it is desirable to enclose for the sake of protection. In many constructions in which variable speed transmissions and the like, are employed, it is highly desirable to enclose completely such mechanisms to afford protection against dust or moisture. Such an arrangement is particularly desirable in connection with machines which handle pulverized or dusty materials, as, for example a biscuit cutting machine. For example, the illustrative construction may be completely enclosed or to any extent desired, by a protective casing, illustrated diagrammatically in dotted lines in Figs. 1 and 2. The lubricant may be introduced from the exterior at any suitable point in the shafts.

It is not practicable, however, to enclose such mechanisms, if they require relatively frequent inspection or attention. Unless the mechanism will operate efficiently for long periods without inspection or the necessity of replacement of parts, the protective enclosure of such parts involves numerous disadvantages which often outweigh the advantages to be gained by protective enclosure. For example, it is not practical to enclose the illustrative variable speed transmission in a casing unless the same can be efficiently lubricated from the exterior of the protective enclosure and unless the same will operate efficiently and reliably for long periods of time wthout serious wear or wthout attention to parts within the casing. Insufficient or faulty lubrication causes wear, rusting and sticking of parts, which increase the danger of interruption of operation. In many machines, the loss due to interruption of operation is far greater than the cost of repairs or replacements.

In the arrangement shown, the action of centrifugal force on the lubricant within the passages does not retard, but rather assists the forward and outward flow of the lubricant. This is in striking contrast to the frequent failure of oil cups placed on the rotating parts, for example, on the hubs of the discs, to supply lubricant, owing to the counteraction of centrifugal force. A leakage in the oil cup usually resulted in the loss of oil. In such arrangements the lubricant tended to flow away from, instead of toward, the bearing surface.

The slight play between the hub of the disc and the shaft during rotation assists the travel of the lubricant along the shaft beyond the grooves 35. This arrangement insures the complete protective lubrication of the bearing surface between the shaft and disc throughout the region of adjustment of the discs along the shaft. Frequently the adjustment remains the same for long periods of time. In the absence of complete and adequate lubrication, the hubs of the discs often rust or "freeze" to the shaft in the areas of bearing surfaces over which the supply of lubricant is not maintained. The certainty of adequate lubrication from the system above described permits a much closer fit of the disc-hubs on the shaft than heretofore possible. This close fit minimizes the tilting or canting of the discs on the shaft under the lateral pressure of the belt 14 upon the inclined surfaces of the discs. Even a relatively slight amount of looseness and canting produces a certain amount of wear because of repeated applications of lateral pressure during rotation,—particularly in the region of the inner edge 44 of the bearing surfaces of the discs. Under prolonged service, the increased amount of canting or play between the discs and the shaft permits irregular slipping between the belt and the surface of the disc, thus seriously impairing, if not destroying, the value of the speed transmission.

Obviously, the invention is not limited to the details of construction and arrangement of the illustrative embodiment, but may be variously modified. Moreover it is not indispensable that all features of the invention be used conjointly; they may be employed advantageously in various different combinations and sub-combinations.

Having thus described our invention, we claim:

1. In mechanism of the class described, the combination of a shaft, a power-transmitting element on said shaft and adjustable longitudinally thereof, and lubrication supply means independent of said element for effecting a lubrication between said shaft and said element irrespective of the adjustment of said element on said shaft.

2. In mechanism of the class described, the combination of a rotary shaft, a rotary power-transmitting element splined to said shaft for transmitting rotation and for adjustment relative thereto, said spline connection comprising a keyway in said shaft and spline therein, said spline and keyway being relatively constructed and arranged to provide a passage for conducting lubricant to said element and said element provided with a passage for receiving the lubricant to lubricate between said shaft and element.

3. In mechanism of the class described, the combination of a rotary shaft, a rotary power-transmitting element splined to said shaft for transmitting rotation and for adjustment relative thereto, said spline connection comprising a keyway in said shaft and spline therein, said spline and keyway being relatively constructed and arranged to provide a passage for conducting lubricant to said element and said element provided with a plurality of grooves connecting with said passage and spaced longitudinally of said shaft for distributing lubricant between the bearing surfaces of said shaft and element.

4. In mechanism of the class described, the combination of a rotary shaft, a rotary power-transmitting element splined to said shaft for transmitting rotation and for adjustment relative thereto, said spline connection comprising a keyway in said shaft and spline therein, said spline and keyway being relatively constructed and arranged to provide a passage for conducting lubricant to said element and said element provided with a plurality of grooves spaced longitudinally of said shaft and a connecting passage communicating with passage in said shaft, whereby lubricant supplied through said shaft is distributed between the bearing surfaces of said shaft and element.

5. In mechanism of the class described, the combination of a rotary shaft, a rotary power-transmitting element splined to said shaft for transmitting rotation and for adjustment relative thereto, said spline connection comprising a keyway in said shaft and spline therein, said spline and keyway being relatively constructed and arranged to provide a passage for conducting lubricant to said element and said element provided with a plurality of grooves spaced longitudinally of said shaft and a connecting groove running longitudinally of said shaft, said shaft provided with a passage connecting with said keyway passage and terminating at the periphery of said shaft in register with said longitudinal groove whereby lubricant may be supplied to said element independently of the relative adjustment between said shaft and element.

6. In a variable speed transmission, the combination of a shaft, a pair of friction discs splined to said shaft for transmitting rotation and for adjustment longitudinally thereof, a passage for lubricant associated with the spline seat in said shaft and lubricating grooves in the bearing surfaces of said discs and passages in said shaft connecting said spline seat passage with the grooves in said discs whereby lubricant may be transmitted from said shaft to the bearing surfaces between said discs and shaft.

7. In a variable speed transmission, the combination of a shaft carrying a power-transmitting element splined thereto for transmitting rotation and capable of adjustment thereon, a protective enclosure surrounding the operative parts of said transmission and arranged to permit a portion of said shaft to project to the exterior, means for lubricating the bearing surfaces between said shaft and element from the exterior comprising a lubricating passage in said shaft terminating at the surface of said shaft in the region of said bearing surfaces, said element provided with lubricating passages in its bearing surface communicating with said shaft passage, and means on the exterior of said enclosure for permitting the introduction of lubricant into said shaft passage.

8. In a variable speed transmission, the combination of a shaft carrying a power-transmitting element splined thereto for transmitting rotation and capable of adjustment thereon, a thrust bearing on said element by means of which the latter's adjustment on the shaft may be determined, a protective enclosure surrounding said transmission and arranged to permit a portion of said shaft to project to the exterior, means for lubricating said thrust bearing from the exterior comprising a passage in said shaft extending into said casing and terminating at the surface of shaft adjacent said element, a passage in said element leading from said thrust bearing and terminating at the surface of said shaft in register with the terminal of said shaft passage, and means at the projecting portion of said shaft for permitting the introduction of lubricant for said thrust bearing into said shaft passage.

9. In a speed changing transmission, the combination comprising a rotary shaft having a pair of cone transmission discs slidably keyed thereon and constructed and arranged to carry a belt and to serve as a pulley of adjustable diameter, means including a thrust bearing on each of said discs for adjusting them longitudinally on said shaft, a lubricating passage for distributing lubricant over the sliding bearing surface of said shaft and disc and communicating with a lubricating passage in said disc hub leading to said thrust bearing, and means whereby lubricant may be forced through said communicating passages to lubricate said shaft and disc bearing surfaces and said thrust bearing.

10. In a speed changing transmission the combination comprising a rotary power shaft having a pair of cone transmission discs slidably keyed thereon for carrying a belt and serving as a pulley of adjustable diameter, means including thrust bearings on the hubs of each of said discs for adjusting said discs longitudinally on the shaft to vary the pulley diameter, said thrust bearings being constructed and arranged to carry the longitudinal thrust on said discs, a passage for distributing lubricant over the disc and shaft bearing surfaces and communicating with a passage in said disc hub leading to said thrust bearing, said hub passage being substantially radial whereby the centrifugal force of the rotation of said shaft and disc assists in carrying lubricant through said passage bearing, and means whereby lubricant may be forced through said passage and into said communicating passage to supply lubricant to said disc and shaft bearing surfaces and said thrust bearing.

11. In a variable speed transmission the combination comprising a rotary power shaft having thereon a pair of cone friction discs slidably splined on said shaft and co-operating to effect variations in speed, thrust bearings on the hubs of each of said discs for carrying the longitudinal thrust thereon, a lubricating passage in each of said hub discs for supplying lubricant to the sliding bearing surface of said disc and shaft and communicating with a passage leading to said thrust bearing, and means operable irrespective of the adjusted position of said disc on said shaft, whereby lubricant may be forced through said communicating passages for supplying lubricant to said disc and shaft bearing surfaces and said thrust bearing.

In testimony whereof, we have signed our names to this specification.

THOMAS L. GREEN.
WILLIAM PRESLEY MORTON.
CHARLES H. WILLIAMS.